Dec. 23, 1958

E. KERN 2,866,144

COMMUTATORLESS CONVERTER MOTOR
WITH SUPPLEMENTARY WINDING

Filed Jan. 25, 1956

United States Patent Office 2,866,144
Patented Dec. 23, 1958

2,866,144

COMMUTATORLESS CONVERTER MOTOR WITH SUPPLEMENTARY WINDING

Erwin Kern, Ennetbaden, Switzerland, assignor to Aktiengesellschaft Brown, Boveri & Cie, Baden, Switzerland, a joint-stock company Application January 25, 1956, Serial No. 561,270

Claims priority, application Switzerland January 25, 1955

6 Claims. (Cl. 318—138)

It is known in connection with electric motors to use a current converter instead of a commutator for producing a rotating field, the correct voltage always being supplied to the motor with the aid of a grid control system. For this purpose motors are used whose rotor is fed by way of this converter arrangement from a direct-current or alternating current system, the field being supplied with direct current either from a direct current network or by way of rectifiers from an alternating current system. It is immaterial whether the stator represents the armature or excitation circuit or the rotor the excitation or armature circuit.

When the supply comes from the direct current system the converters operate as inverters. When the supply comes from the alternating current network the motor is connected by means of rectifiers and inverters, with or without an intermediate direct-current circuit. The use of inverters requires that special attention should be paid to the commutation process. It is known that this should occur some time before the point of intersection of the consecutive alternating voltages which overlap. Premature ignition is necessary. This is the time between the occurrence of the ignition of the converter which takes over up to the instant when the point of intersection of the two consecutive voltages which relieve each other is reached, in this case the back voltages of the motor. It is known that it can be considered as consisting of two parts, the actual commutating time during which both converters are current conductive, and the free time which is necessary in order to attain a complete blocking effect. With converter controlled motors both the commutation time and the instant when consecutive voltages relieve each other, depend upon the load, the commutation time increasing with the load, so that the ignition must be made to occur so early that the motor still operates correctly with maximum load and no short circuits between the voltages or unstable running occurs. The instant of the voltage change-over is made to occur earlier in dependence on the load. This makes an even earlier ignition necessary or if the ignition point is fixed, the load capacity of the motor is reduced. The displacement of the point of intersection of the opposing voltages which overlap, is known to be due to the effect of the armature on the excitation. At no-load, the field curve has the form of a rectangle or trapezoid. With a load, however, the field curve becomes distorted by the armature reaction and at the same time displaced tangentially, so that premature ignition is reduced. This results in the aforementioned disadvantages.

According to the invention these disadvantages are eliminated by providing in the excitation part of the motor in addition to the excitation winding an additional winding which is supplied with a direct current proportional to the load current and whose magnetic axis is displaced with respect to that of the main field, so that its field opposes the armature reaction caused by the load. It is known per se to provide additional windings in converter controlled motors. Up to the present these have only been employed to make the characteristic curves of the motor dependent on the load. The field of such an additional winding thus always lies in the axis of the main field and does not influence the ignition instant in the manner required when a converter feeds the motor. According to the invention the axis of the additional winding is displaced in the excitation circuit with respect to that of the main field, so that the point of intersection of consecutive voltages can be influenced. The armature reaction can thus be completely compensated by the field of this additional winding, but it is also possible to make the field of the additional voltage so strong that the aforementioned intersection of the voltages is moved back as regards time and the displacement of the ignition in the leading sense is increased. In this case there is increased protection against unstable operation and short-circuits, and the operation of converter-controlled motors even with large load peaks, is extremely reliable.

According to the invention the conductors of the additional winding are embedded in the pole shoes in an insulated manner.

The additional winding can be so connected that for example when the supply comes from a direct-current network, the load current from the direct-current side passes through it. It is however sufficient when by means of a shunt only part of this current passes to the winding. When alternating or three-phase current is used, a different arrangement is employed depending upon whether an intermediate direct-current circuit is provided or not. In the former case the current in the intermediate circuit flows through the additional winding or part of it, whilst in the latter case however the current has to be taken from the alternating current side in order to achieve dependence on the load. Current transformers are then provided which are connected to the additional winding by means of rectifiers. These current transformers can be located either in the circuit of the alternating current supply system or directly in the main current circuit of the motor after the converter set. In the latter case care must be taken to ensure that the transformation of the current transformers is as far as possible independent of the frequency.

Figure 1:
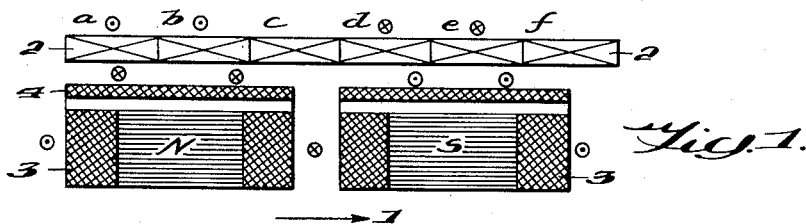
Fig. 1 is a generic diagrammatic illustration of my invention.

In Fig. 1 reference numeral 1 indicates the field magnet which carries the excitation winding and 2 are the armature windings of the stator. In this example it is assumed that the excitation winding rotates with the field poles and the armature is stationary. The opposite arrangement can of course also be employed. The armature bars through which the main current flows are indicated by $2a$ to $2f$. The current flow of neighbouring conductors is displaced by 60°. With the relative position of the armature and field magnet shown in the drawing, $2a$ and $2d$ correspond to the phase position of phase $v$, $2b$ and $2e$ to that of $u$, and $2c$ and $2f$ to that of $w$. At the indicated instant, current flows in $u$ ($2b$) in a direction perpendicular to the plane of the paper from the rear to the front, this being indicated by the encircled dot which is the tip of the arrow for showing the direction of the current. This current flows in the opposite direction in bar $2e$, this being indicated by the encircled cross for the arrow going in the opposite direction, and it flows back again in phase v as can be seen in Fig. 1. The current in bar 2d thus flows from the front to the rear and in 2a from the rear to the front. Bars 2c and 2f are without current at this instant. The excitation winding supplied with direct current is designated by 3 and the direction of flow is also indicated. This winding surrounds the poles of the field magnet in a known manner. The additional winding 4 according to the invention is embedded in the pole shoes. The current flows through this winding from front to rear at the north pole and from rear to front at the south pole. It will be noted that the direction of the current and thus the flux is opposed to the armature current and thus the effect of the latter can either be weakened, compensated or reversed, depending upon the strength of the current. The current flowing in this additional winding is proportional to the load current, so that the effect always remains the same independently of the load.

Figure 2:
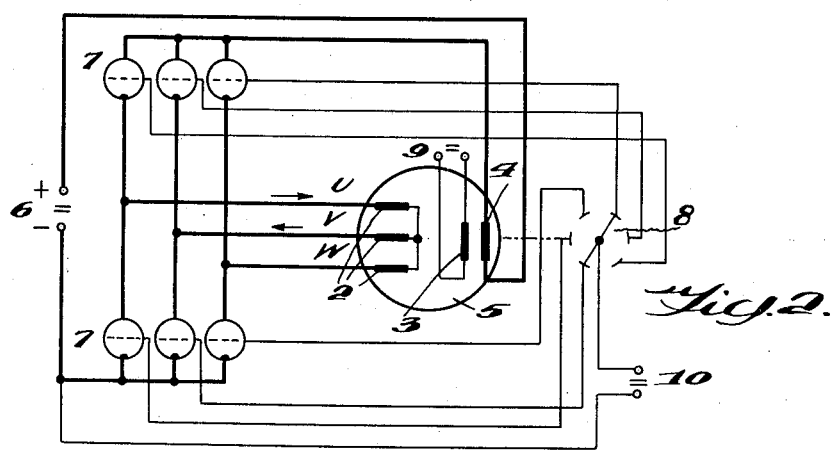
Fig. 2 is an electrical schematic diagram of the invention as utilized in an embodiment where the converter motor is fed from a direct-current supply.

Fig. 2 shows an arrangement where the converter motor 5 is fed from a direct-current system 6. Reference number 7 indicates the inverters whose ignition is controlled by the control device 8 and the auxiliary direct voltage 10. The armature windings of the motor are indicated by 2 and the excitation winding by 3. Reference number 4 indicates the additional winding which in accordance with the invention effects the improvement in the ignition by compensating the armature reaction. It is located directly in the direct-current circuit supplying the inverters.

Figure 3:
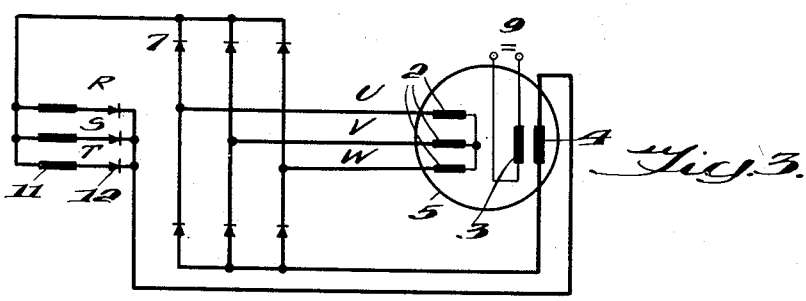
Fig. 3 is a schematic diagram of the invention as utilized in an embodiment where the converter motor is fed from an A.-C. supply.

In Fig. 3 the converter motor is supplied from an alternating current network. The control device is not shown and only the armature and excitation circuit are illustrated. The alternating current is for instance represented by the star-connected secondary winding 11 of an alternating current transformer. The rectifiers 12 rectify the alternating current and supply it to the inverter arrangement. The additional winding in this case lies in the intermediate direct-current circuit.

Figure 4:
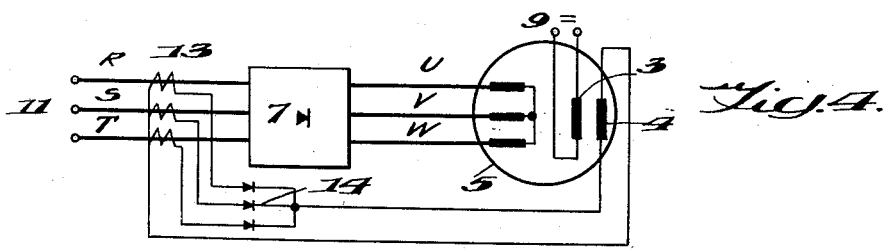
Fig. 4 is a schematic diagram of a second embodiment of the invention where the converter motor is fed from an A.-C. supply.

In the embodiment illustrated in Fig. 4 the A.-C. supply voltage 11 is fed directly through the inverter unit 7 to the armature windings 2. The excitation winding 3 is supplied by the excitation voltage source 9. A three-phase voltage is tapped off from the A.-C. supply voltage by means of the transformers 13 and is rectified by means of the rectifiers 14. This rectified voltage, which is thus a function of the load current, is then supplied to the additional winding 4 in accordance with my invention.

While in accordance with the provisions of the statutes I have illustrated and described the best form of embodiments of my invention known to me, it will be apparent to those skilled in the art that changes may be made in the form of the invention described without departing from the spirit of my invention as set forth in the appended claims.

I claim:

1. In a commutatorless converter motor having an excitation circuit including field poles excited by direct current and an armature circuit including armature conductors, means for opposing the armature reaction caused by the load current in the armature circuit comprising an auxiliary winding in the excitation circuit supplied by a direct-current proportional to the load current, said auxiliary winding being arranged with respect to the field poles to develop a magnetic flux having an axis displaced with respect to that of the main field.

2. A commutatorless converter motor as defined in claim 1 wherein the conductors of the auxiliary winding are insulated and are embedded in the pole shoes of field poles of opposite polarity.

3. A commutatorless converter motor as defined in claim 2 wherein the direction of current travel through the conductors of the auxiliary winding is opposite to the direction of current travel through adjacent conductor bars of the armature winding arranged generally parallel with respect to the auxiliary winding bars.

4. A commutatorless converter motor as defined in claim 1, wherein the armature circuit is supplied by alternating current from an inverter network fed from a direct-current source, and said auxiliary winding is connected in series with said inverter network to said direct-current source.

5. A commutatorless converter motor as defined in claim 1, wherein the armature circuit is supplied by alternating current from an inverter network fed from a rectified alternating-current source, and said auxiliary winding is connected in series with the inverter network to said rectified alternating-current source.

6. A commutatorless converter motor as defined in claim 1 wherein the armature circuit is supplied by alternating current from an inverter network fed from a rectified alternating-current source, and said auxiliary winding is fed through rectifiers from current transformers connected to said alternating-current source.

References Cited in the file of this patent

UNITED STATES PATENTS

| | | |
|---|---|---|
| 2,015,745 | Deri | Oct. 1, 1935 |
| 2,023,255 | Stohr | Dec. 3, 1935 |
| 2,085,109 | Ludwig | June 29, 1937 |